United States Patent [19]

Simon

[11] 4,014,968
[45] Mar. 29, 1977

[54] SHRINKAGE CONTROL OF CELLULAR CERAMIC BODIES HAVING AXIAL CAVITIES

[75] Inventor: Raphael A. Simon, Corning, N.Y.
[73] Assignee: Corning Glass Works, Corning, N.Y.
[22] Filed: July 19, 1974
[21] Appl. No.: 489,925
[52] U.S. Cl. .............................. 264/56; 29/157.3 R; 165/8
[51] Int. Cl.² .................. C04B 33/32; B21D 53/02
[58] Field of Search ................. 264/56, 59, 60, 25; 51/293, 308; 165/8; 29/157.3 R

[56] References Cited
UNITED STATES PATENTS

| | | | |
|---|---|---|---|
| 2,102,343 | 12/1937 | Whitcomb et al. | 51/308 |
| 2,467,596 | 4/1949 | Pratt | 51/293 |
| 3,573,021 | 3/1971 | Smith | 264/60 |

OTHER PUBLICATIONS

Campbell, High Temperature Technology, pp. 354–355 (1956).

Primary Examiner—Robert F. White
Assistant Examiner—John Parrish
Attorney, Agent, or Firm—Richard N. Wardell; Clarence R. Patty, Jr.

[57] ABSTRACT

Method of reducing the firing shrinkage of the axial hub opening in a disc-type cellular or honeycomb, ceramic heat exchanger by substantially filling the hub opening with a plug which undergoes substantially the same firing shrinkage as the hub opening. The plug then shrinks with the heat exchanger and keeps the hub opening closed, thereby preventing accelerated heating of the cellular ceramic nearest the hub opening and corresponding local increase in the firing shrinkage due to the accelerated heating. A plug with a bulk density closely approximating that of the ceramic matrix is desirable and a plug fashioned from the same cellular ceramic material as the matrix is particularly convenient and effective.

3 Claims, 1 Drawing Figure

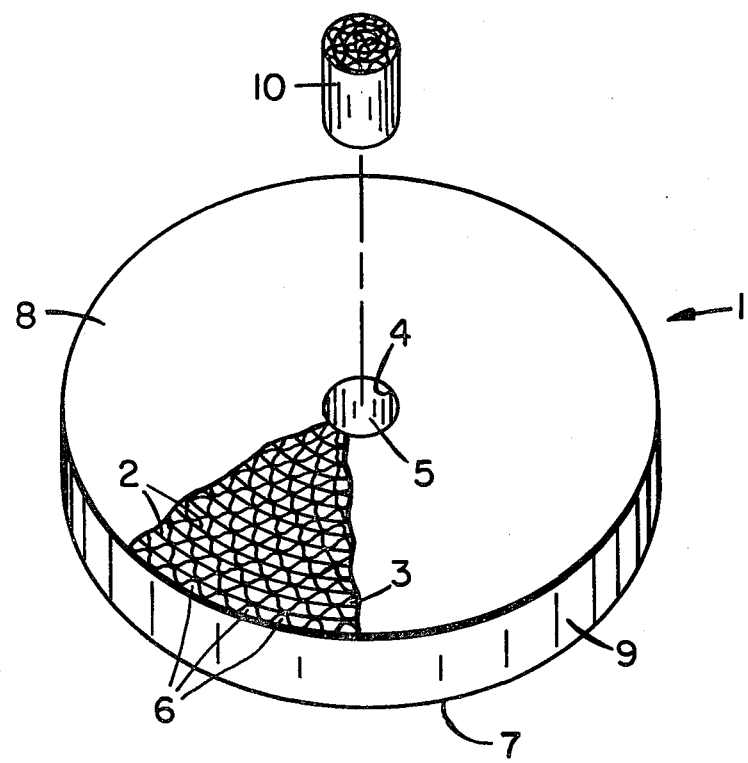

SHRINKAGE CONTROL OF CELLULAR CERAMIC BODIES HAVING AXIAL CAVITIES

BACKGROUND OF THE INVENTION

Firing shrinkage of ceramic ware is a function of temperature history; therefore, local differences in the temperature of the ware during the firing cycle can produce non-uniform shrinkage. In wheel-shaped, cellular ceramic, heat exchangers which are, for example, 36 inches in diameter, 4 ½ inches thick with a 2 ½ inches diameter axially disposed hub opening therethrough, the heating during the firing cycle proceeds from the surfaces and especially from the edges formed at the intersection of the upper and lower surfaces with the rim and hub wall surfaces. Internal, unexposed portions of the heat exchanger lag in temperature behind the exposed surfaces and edges, and the differences in time at temperature due to the varying lag behind furnace temperature increases the shrinkage locally at the surfaces and the edges relative to the internal portions of the matrix. The shrinkage of the external portions nearest the hub opening thereby put the internal portions into tension and may result in fracture of integrally formed cellular ceramic or delamination of layered cellular ceramic matrices. Testing has shown that a very high percentage of all delaminations in layered cellular ceramic matrices occurs within a distance of one-half the matrix radius from the central axis.

Increased shrinkage of the rim of the heat exchanger would normally result in compressive stresses on the periphery, but the effects of the compression are not as severe as the effects of a central tension. In addition, accelerated heating around the rim is often retarded by ringing the perimeter with refractory bricks during firing.

Methods of fabricating cellular heat exchangers by layering ceramic green sheets are disclosed in U.S. Pat. Nos. 3,112,184 (Hollenbach) and 3,251,403 (Smith) and are incorporated herein by reference. In general, the method of fabricating a disc-type matrix comprises wrapping alternate layers of flat and corrugated or crimped flexible carrier sheets, coated with a pulverized ceramic material suspended in a binder, circumferentially around a rotating shaft or hub. Smith further suggests that a rigid covering sheet of ceramic material be joined with a foamed ceramic cement on surfaces parallel to the direction of unobstructed cells. In a disc-type heat exchanger with unobstructed cells extending parallel to the central axis, the rigid covering sheets would be covering the periphery or rim of the matrix and the surfaces or hub walls defining the hub or shaft opening. The resultant fabricated matrices are thereafter heated to a sufficiently high temperature to sinter the ceramic material to a unitary structure.

Known ceramic coating materials for the carrier sheets used in fabricating the matrices include low coefficient of thermal expansion materials such as the lithium aluminosilicates, especially glass or crystalline petalite and beta spodumene, or glassceramics having the lithium aluminosilicate base and in particular those made according to Example 1 of U.S. Pat. No. 2,920,971 (Stookey) and according to U.S. Pat. No. 3,600,204 (Beall et al.), which are incorporated herein by reference.

SUMMARY OF THE INVENTION

It is an object of the present invention to control the shrinkage which occurs in a cellular or honeycomb, ceramic matrix during the firing cycle, such that the shrinkage is substantially uniform across the diameter of the matrix.

In particular, it is the object of the invention to retard the increased shrinkage of the cellular ceramic heat exchanger matrix, near the axially disposed hub opening extending through the matrix, and due to the accelerated heating of the exposed surfaces defining the hub opening.

In accordance with the objectives, the invention is a method of controlling (i.e., retarding) the shrinkage of the axial hub cavity in an annular or disc-type cellular ceramic, heat exchanger during thermal processing. The method of retarding the shrinkage comprises firing the heat exchanger matrix with a hub insert or plug substantially filling the hub cavity, so that heating initiates from the entire matrix upper surface but not from the hub wall surfaces defining the hub cavity, thereby effecting uniform heating across the central region of the matrix. In order to maintain the uniform heating throughout the firing cycle, the hub cavity must remain closed. This requires that the plug be made of a material which will undergo substantially the same in situ radial shrinkage as the matrix itself. This also allows the plug to be easily knocked out of the hub cavity after firing.

In matching the shrinkage of the plug with the shrinkage of the matrix, it is useful if the plug has about the same bulk density as the unfired matrix. The inventor prefers, for convenience and utility, that the plug be made from the same unfired, cellular ceramic as the matrix. In fabricating the matrix by layering corrugated and flat sheets, it is possible to roll flat and corrugated sheets into a cylindrical plug with a diameter equal to (or slightly less than) the diameter of the cylindrical hub cavity. Of course, the hub cavity need not be cylindrical in shape, and the plug can be made into the appropriate melting shape.

DETAILED DESCRIPTION OF THE INVENTION

The invention relates to firing shrinkage control for annular, cellular ceramic bodies and in particular for disc-type rotary regenerator matrices for application with gas turbines. Such matrices of the type are characterized by a plurality of unobstructed gas flow paths or cells defined by thin walls of ceramic material. The regenerator matrix further includes an axially disposed hub cavity extending parallel to the matrix central axis for rotatably mounting the matrix on an axle or shaft means in use. The hub cavity is generally cylindrical but could be any other convenient shape.

Looking at the Figure, a simple, annular regenerator matrix 1, made according to the teaching of U.S. Pat. No. 3,112,184, is shown. In a typical fabrication of a matrix, alternating layers of flat sheets 2 and corrugated or crimped sheets 3 are coated with a thermally devitrifiable glass frit, and rolled or wrapped circumferentially around a 2 ½ inches diameter core element (not shown). The sheet in contact with the core element forms the hub wall surface 4 which also defines the cylindrical hub cavity 5 extending through the matrix. A hub wall surface covering member could also be cemented to the hub wall surface 4 according to the teaching of U.S. Pat. No. 3,251,403. In either case, the hub cavity 5 provides the site for rotatably mounting the fired matrix on a shaft or axle means for use.

The flat and corrugated coated sheets, when alternately wrapped, form unobstructed gas channels 6 extending from a bottom surface 7 of the matrix to a top surface 8 thereof, and generally parallel to the central axis of the body. Along the periphery or rim of the annular matrix, the alternately laid sheets may be covered with a rim wall (U.S. Pat. No. 3,251,403) or the flat sheet may be continuously wrapped about the circumference to cover the rim, either method thereby forming a rim surface 9 surrounding the matrix.

The above rotary matrix is well within the prior art. The invention herein is in the method of firing such a matrix without incurring substantially larger shrinkage of the hub surface 4 and the flat and corrugated sheets 2, 3 nearest the hub surface (compared with the internal regions of the matrix farther away from the hub surface) as a result of the differences in temperature balance during the firing cycle.

The matrix is commonly fired with the bottom surface 7 resting on a horizontal surface, which may be covered with granular material to facilitate movement during shrinkage in the kiln. During the firing cycle of the matrix, heating proceeds from the top surface 8 and from the rim surface 9 and hub surface 4. Additionally, edges formed at the intersection of the top and the rim surfaces or the top and the hub surfaces each heat from two surfaces and, therefore, lead the temperature of the internal portions of the matrix. The difference in time at temperature caused by the varying temperature lag behind the furnace temperature, effects a larger shrinkage locally at these edges and surfaces (and matrix regions close to these surfaces) than at internal regions.

Existing practice is to retard the accelerated heating of the rim surface by ringing the perimeter of the matrix with fired refractory bricks. This solution is not adaptable to the hub surface, however, since a plug of refractory, which expands with temperature, would interfere with the normal shrinkage of the hub opening (e.g. a 2 ½ inches diameter opening normally shrinks about ½ inch). A smaller diameter plug has no utility since it would leave a gap between itself and the hub surface, thereby allowing heating to proceed from the hub surface.

Looking again at the Figure the hub insert or plug 10 of the present invention is shown prior to assembly in the green (unfired) regenerator matrix 1. The plug 10 is pictured as a cellular ceramic plug which has been rolled from alternating layers of the flat and corrugated green ceramic sheets, similar to those used in fabricating the matrix 1. The outside diameter of the plug 10 is equal to or slightly less than the diameter of the hub cavity 5 to allow assembly therein. The plug 10 of green ceramic material has about the same bulk density as the matrix 1 and will undergo about the same percentage radial shrinkage in situ as the matrix, thereby maintaining close contact between the plug 10 and the hub surface 4 throughout the firing cycle. The radial shrinkage of the matrix 10 herein is measured as the percent decrease in the dimension measured from the heat exchanger central axis 11 to the rim surfaces 9. The percent radial shrinkage of the plug 10 during the firing cycle is measured in situ from the same central axis to the periphery of the plug.

A measurement of shrinkage in a tangential direction perpendicular to any radius from the matrix center, and in particular, the tangential shrinkage differential in comparing the matrix center with the matrix periphery is also informative. For example, a large differential in tangential shrinkage across the matrix results from firing the matrix without the hub plug. The accelerated heating of the hub surface and the consequent increased shrinkage thereof results in the inner layers of wrapped flat and corrugated sheets being shorter than that required to maintain contact with the adjacent outer layers. Actual separations known as delaminations then occur because of this radial tension. Inventor records indicate that about 90% of all delaminations occur in the inner half of the matrix.

The differential tangential shrinkage causing delamination may be reduced substantially by firing the matrix with the hub plug of green cellular ceramic filling the axial hub cavity.

In an actual test, two regenerative matrices (36 inches in diameter, 4 ½ inches thick with 2 ½ inches diameter hub openings), such as the one shown in the Figure, were fired in horizontal position with their bottom surfaces resting on a setter plate. One of the hub openings was left open and the other was plugged with a green hub insert which comprised alternating layers of flat and corrugated green ceramic sheets rolled into a cylindrical shape of diameter slightly less than the diameter of the matrix hub opening. The matrix and the plug were made according to the teaching of Hollenbach using a thermally devitrifiable glass frit disclosed by Beal et al., Example 1, and consisting essentially of, on the oxide weight basis, 72.6% $SiO_2$, 22.5% $Al_2O_3$, and 4.9% $Li_2 O$. The firing schedule of the furnace and the matrix was as follows:

Room temperature to 700° C at about 250° C/hour
Hold 2 hours at about 700° C
700° C to 800° C at about 20° C/hour
800° C to 900° C at about 10° C/hour
900° C to 1000° C at about 25° C/hour
1000° C to 1300° C at about 100° C/hour
Hold 10 hours at about 1300° C
Cool to 1000° C at about 50° C/hour
Cool to room temperature at about 100° C/hour The results contrasting the tangential shrinkages at various radial distances from the central axis of each matrix are shown in Table I.

TABLE I

Tangential Shrinkage at Various Radial Locations

| Fired Radius (inches) | Closed Hub | Open Hub |
|---|---|---|
| 2 | 18.1% | 19.8% |
| 4 | 17.7% | 16.4% |
| 6 | 17.0% | 16.4% |
| 8 | 17.3% | 16.7% |
| 10 | 17.3% | 16.0% |
| 12 | 17.3% | 16.4% |
| 14 | 17.3% | 16.4% |
| 15 | 17.1% | 15.2% |
| Range | 1.1% | 4.6% |

It can be seen that the differential shrinkage, measured tangentially, between the hub surface (and adjacent cellular ceramic material) and any other radial location in the matrix without a hub plug is 4.6%, while in the matrix fired with a hub plug, the differential was only 1.1%. The plug maintained pressure on the hub wall surface throughout the firing cycle. After cooling the matix, the plug was easily knocked from the hub cavity. No problems in removing the plug by simple mechanical means has been encountered.

I claim:

1. A method of controlling the firing shrinkage and delamination in the inner half of a disc-type, honeycomb ceramic matrix having a plurality of unobstructed gas passages extending therethrough substantially parallel to the central axis of the matrix and defined by alternate layers of flat and corrugated ceramic sheets wrapped around an axial hub cavity extending therethrough, the improvement comprising firing the honeycomb ceramic matrix with a temporary plug which substantially fills the hub cavity and which undergoes substantially the same radial shrinkage as the honeycomb ceramic matrix during the firing cycle and removing the plug from the hub cavity after completion of the firing cycle.

2. The method of claim 1 wherein the plug comprises an unfired honeycomb ceramic having substantially the same composition as the honeycomb ceramic matrix and having a plurality of unobstructed cells extending therethrough substantially parallel to the central axis of the matrix.

3. The method of claim 1 wherein the plug has a bulk density which is substantially the same as the bulk density of the matrix.

* * * * *